United States Patent [19]

Shiotani

[11] 4,143,824
[45] Mar. 13, 1979

[54] VESSEL AND BLADES FOR FOOD PROCESSOR, OR THE LIKE

[75] Inventor: Tadahiko Shiotani, Komaki, Japan

[73] Assignee: Sanyei Corporation, Tokyo, Japan

[21] Appl. No.: 828,281

[22] Filed: Aug. 29, 1977

[51] Int. Cl.² .............................................. B02C 18/18
[52] U.S. Cl. ................................. 241/282.1; 366/314
[58] Field of Search ............. 241/199.12, 282.1, 282.2; 366/314

[56] References Cited

U.S. PATENT DOCUMENTS

| 3,172,441 | 3/1965 | Hartwig et al. | 241/282.1 |
| 3,612,126 | 10/1971 | Emmons | 241/199.12 |
| 3,892,365 | 7/1975 | Verdun | 241/282.1 X |

FOREIGN PATENT DOCUMENTS

| 1075810 | 2/1960 | Fed. Rep. of Germany | 241/199.12 |
| 260525 | 7/1940 | Switzerland | 241/199.12 |
| 290212 | 7/1953 | Switzerland | 241/282.2 |

Primary Examiner—Howard N. Goldberg
Attorney, Agent, or Firm—Ostrolenk, Faber, Gerb & Soffen

[57] ABSTRACT

In a food processor, comprising a rotated shaft and blades, or the like, removably fastened to the shaft, with the blades being located in a food processing vessel, the vessel having a bottom surface which is generally frustoconical in shape, with the cone projecting up into the vessel; the blades inside the vessel are also inclined correspondingly with the bottom of the vessel.

8 Claims, 4 Drawing Figures

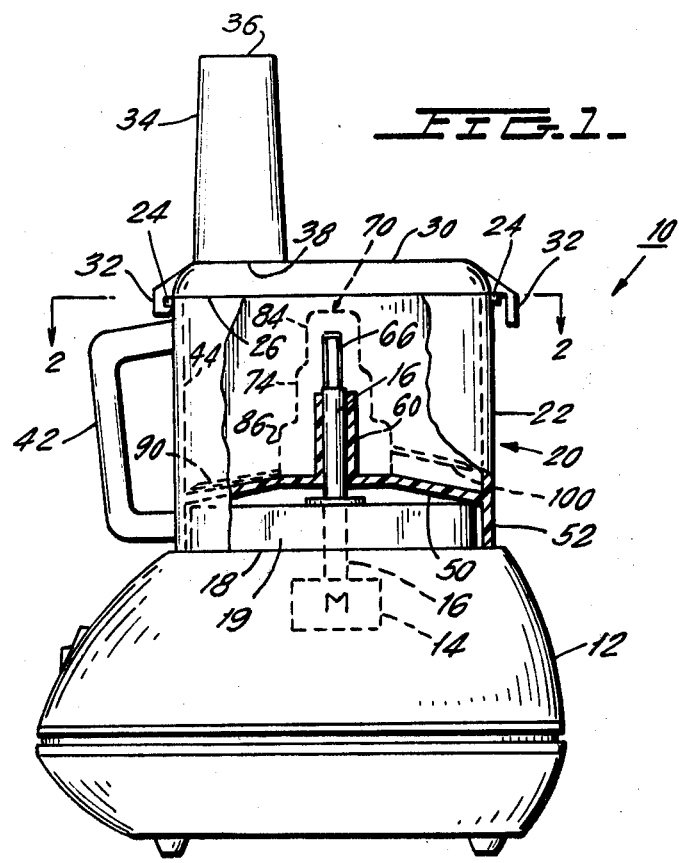
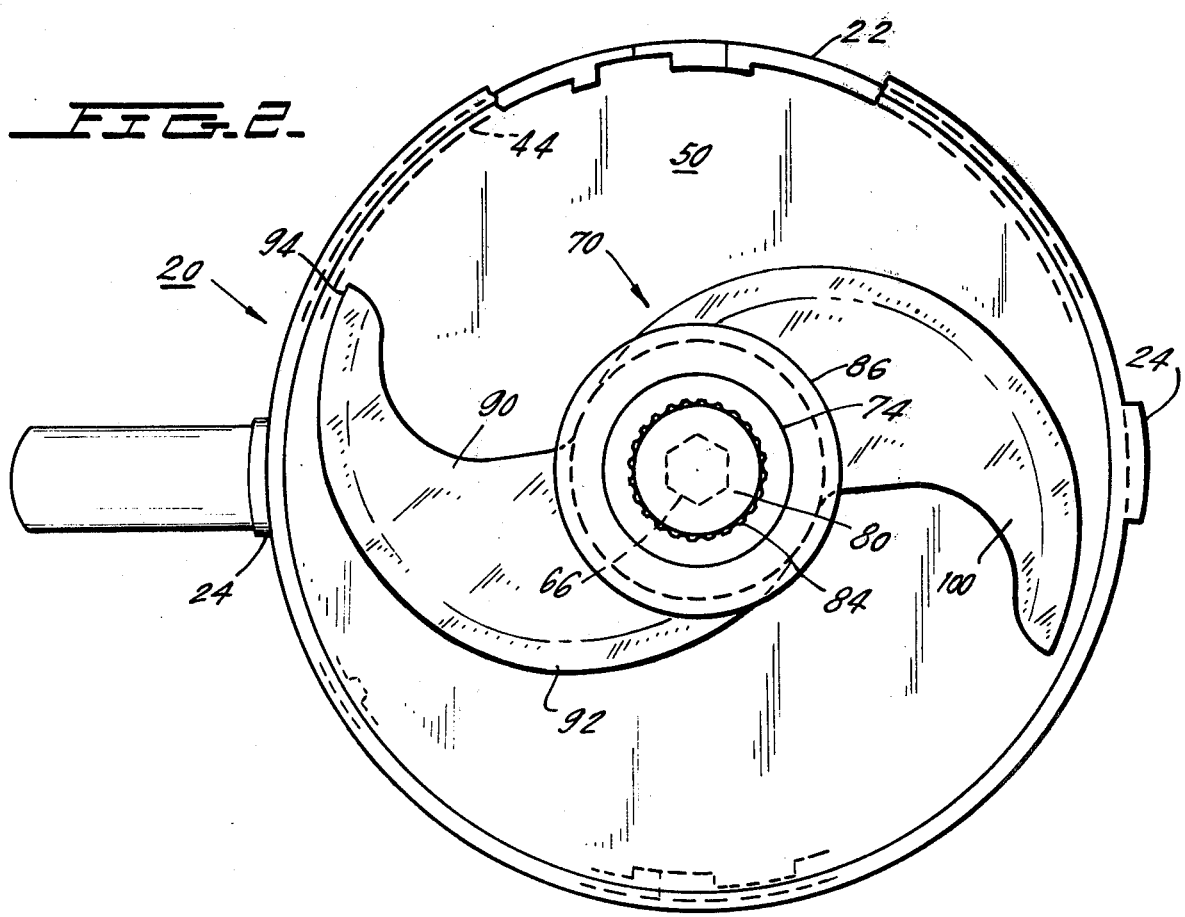

VESSEL AND BLADES FOR FOOD PROCESSOR, OR THE LIKE

FIELD OF THE INVENTION

The invention relates to the vessel and blade assembly for a food processor.

BACKGROUND OF THE INVENTION

There have within the last few years been developed a product that is generically referred to as a food processor. An example of this appears in U.S. Pat. No. 3,892,365. Basically, a food processor comprises a supporting base, a motor driven shaft projecting up from the base, a food holding vessel that is supported on the base and that has a hole through its bottom through which the driven shaft passes, and a plurality of food cutting, grating, grinding, mixing, etc. blade assemblies each attached to a respective hub and each hub being emplaceable inside the vessel on the driven shaft.

The vessels of these food processors have been generally cylindrical in shape with an open top that is closed by a removable lid and with a flat or horizontal bottom for containing the food being processed. For those blade assemblies that cut, chop, blend or even mix the food in the vessel, the blade assemblies are typically comprised of one blade that is supported just above and generally in a plane parallel to the flat bottom of the vessel and that blade extends from the hub radially outwardly almost to the inside wall of the vessel. The blade assemblies are also comprised of a second blade that is supported somewhat higher along the hub, and that is also generally in a plane parallel to the flat bottom of the vessel and that blade also extends radially from the hub almost to the inside wall of the vessel. Food lying at the bottom of the vessel is acted upon by both of the blades as they are rotated.

SUMMARY OF THE INVENTION

It is the primary object of the invention to improve the processing of food in the vessel of a food processor.

It is another object of the invention to improve the configuration of a food processor vessel.

It is a further object of the invention to improve the configuration of the blades of a food processor.

It is yet another object of the invention to shape the bottom of a vessel to improve the processing of the food.

According to the invention, the vessel of the food processor includes a bottom having a centrally located hole therethrough and a centrally located cylinder upstanding from the bottom of the vessel and surrounding the central hole in order that food being processed will remain in the vessel and not exit through the central hole in the bottom.

The vessel is seated on a support base. A motor driven shaft projects above the support base. The driven shaft extends through the central hole in the bottom of the vessel and through the central cylinder above the hole.

At least one blade assembly is provided. It comprises a central hub that is received on the upstanding driven shaft. The central hub supports one blade extending from one side of the hub and near the bottom of the vessel and the hub also supports a second blade which projects from the diametrically opposite side of the hub. The second blade projects from the hub at a location somewhat above the bottom of the vessel. Both of the blades extend radially outwardly almost to the interior wall which defines the cylindrical outside of the vessel.

The bottom of the vessel is generally frusto-conically or taperingly shaped, with the apex of the cone projecting upwardly into the vessel. The conical bottom of the vessel meets the interior wall of the vessel at an acute angle. Toward the center of the vessel, its bottom is not taperingly shaped, but is flat and horizontal in the vicinity of the central cylinder around the central opening in the bottom. The bottom of the blade supporting hub is just above the flattened central portion of the bottom of the vessel.

The blades projecting from the hub do not project straight horizontally out. Instead, the lower blade is inclined at an obtuse angle with respect to the hub so as to extend generally parallel to the inclination of the bottom of the vessel. Similarly, the second blade, i.e. the one higher up along the hub, is correspondingly inclined so as to extend parallel to the inclination of the bottom of the vessel. Both blades sweep around the hub to define respective conical surfaces.

It has been found, through empirical observation and experimentation, that food, and particularly raw meat, can be processed more rapidly with a vessel and blade assembly according to the invention than with a vessel bottom that is flat, horizontal and with a correspondingly oriented set of blades. This results in energy saving and time saving during use of the food processor.

Further objects and features of the invention will become apparent from the following description taken in conjunction with the accompanying drawings.

BRIEF DESCRIPTION OF THE DRAWINGS

FIG. 1 is a side elevational view, with the vessel and blade assembly partially in cross-section, showing a food processor adapted with the vessel and blade assembly of the invention;

FIG. 2 is a top plan view into the vessel of the food processor, in the direction of arrows 2 in FIG. 1;

DESCRIPTION OF A PREFERRED EMBODIMENT

Figure 4:
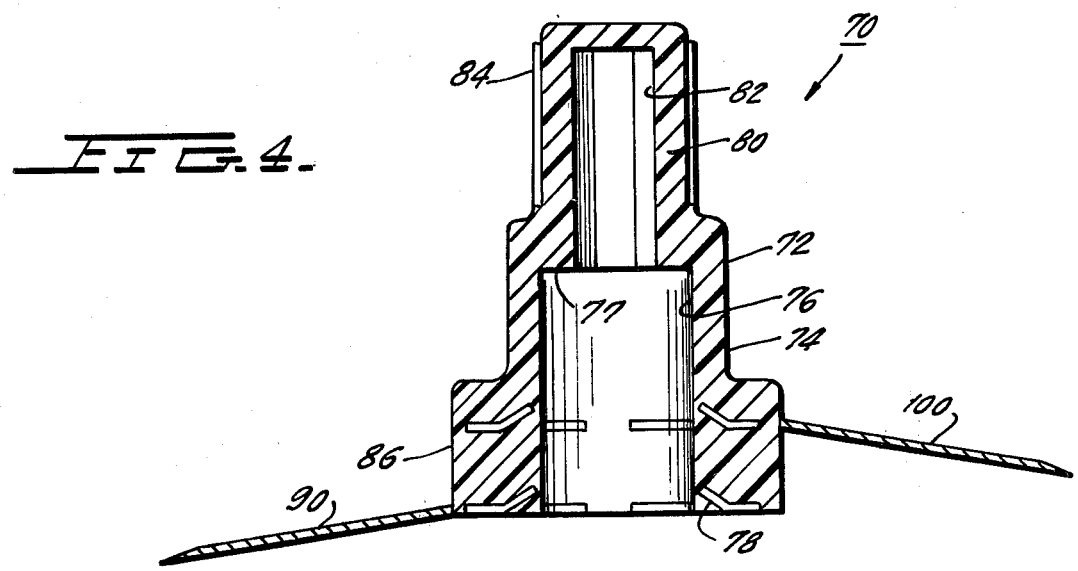
FIG. 4 is a side elevational cross-sectional view of the blade assembly according to the invention.

FIG. 1 shows a food processor 10 adapted with the present invention. The food processor includes a supporting base housing 12 in which there is a conventional motor 14 for rotating the drive shaft 16 that projects out of the top of the base housing 12. The base housing 12 has an upper surface 18 on which the vessel designed according to the invention is seated. Atop the upper surface 18 of the base housing 12 is a short height cylindrical vessel support 19 which is nestingly received at the bottom of the vessel 20 for holding the vessel stationary, as described further below. The shaft 16 projects through and above the top surface 18 of the housing 12 and the vessel support 19.

There is seated atop the support surface 18 of the housing 12 and received over support 19 a vessel 20 designed according to the invention. The vessel is generally cylindrical in shape, being defined by the annular side wall 22. At the top of the side wall 22 are the mounting lugs 24 by which the lid 30 is secured to the vessel 20. The top 26 of the vessel 20 is open.

The lid 30 is a cover over the open top 26 of the vessel 20. The lid has the mounting tabs 32 which are respectively engageable with the mounting lugs 24 of the vessel, thereby to hold the lid on the vessel. A food insertion tube 34, having a top inlet 36 and an open outlet 38 into the vessel 20, is the conduit through which food to be processed is inserted into the vessel 20. The height of the tube 34 assures that a user's hands will not inadvertently contact moving blades inside of the vessel 20.

Secured at the outside on one side of the vessel 20 is a vessel carrying handle 42.

The interior of the vessel is defined by the cylindrical interior wall 44 on the inside of the side wall 22 and by the vessel bottom 50, of which more will be described below.

The interior wall 22 of the vessel 20 continues downward past the vessel bottom 50 in the depending flange 52, which encloses a hollow cylindrical space. The upstanding cylindrical vessel support 19 on the base housing 12 is shaped so as to nestingly sit inside the flange 52 beneath the vessel bottom 50, thereby to support the vessel securely against lateral movement with respect to the base housing 12. An appropriate projection from the periphery of support 19 extends into slot 54 to attach the vessel flange 52 to the base support 19.

Figure 3:
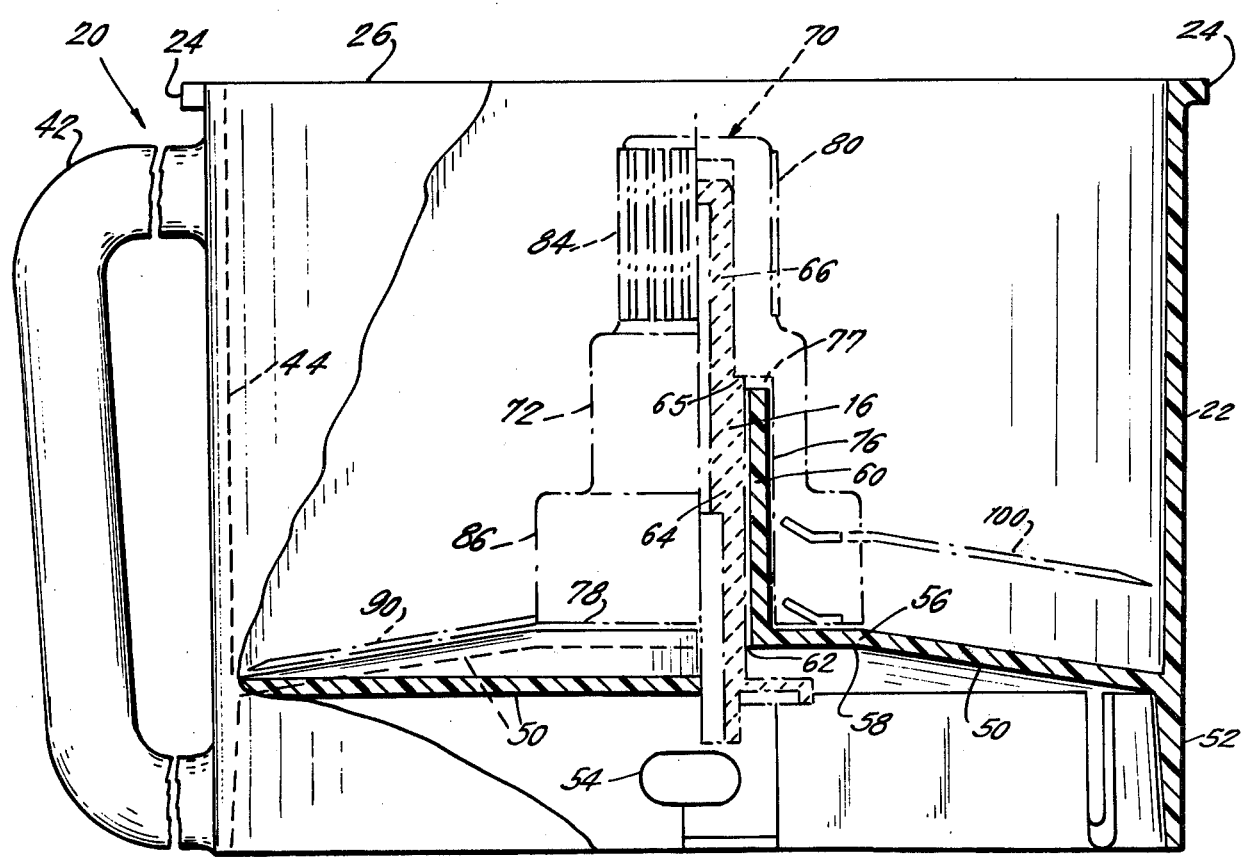
FIG. 3 is a side elevational view, partially in cross section, of the vessel and the blade assembly according to the invention.

Referring to FIG. 3, the vessel bottom 50 is not a flat, planar, horizontal surface as is usually the case with food processors. Instead, the bottom 50 is generally frusto-conically shaped. The outer periphery of the vessel bottom 50 meets the interior wall 44 of the vessel at an acute angle and is conically inclined upwardly into the vessel until the annular top margin 56 of the inclined portion of the bottom of the vessel. Inwardly of the annular margin 56, the bottom 50 has a flat, horizontal, annular section 58, which terminates at its radially inner end in the upstanding cylindrical extension 60. The upstanding extension 60 of the bottom 50 is completely sealed to the bottom 50, whereby any food in the vessel 20 that is below the top of the extension 60 will not leak from the vessel through the central hole 62 therein. The cylindrical extension 60 defines and surrounds a hole 62 through the center of the vessel bottom 50. The driven shaft 16 from the housing 12 projects upwardly through the hole 62 and the extension 60. The cylindrical extension 60 of the bottom 50 has an opening therethrough that is approximately the width of the shaft 16. The end of the shaft 16 projecting into the vessel 20 includes the lower shank portion 64, with a circular cross-section, which extends up to the height of the top of the cylindrical extension 60 of the vessel bottom 50. Above the shank 64 of the shaft 16 is the narrower width, polygonal cross-section shaft section 66. The polygonal shape permits driving engagement between the shaft 16 and the below described hub 72. The shaft section 66 is narrower than the shaft section 64, and these two shaft sections are joined by a horizontal shelf section 65 of the shaft.

In FIGS. 3 and 4, the blade assembly 70 is illustrated. It is comprised of the support hub 72 that is driven by the driven shaft 16, is comprised of the lower blade 90 and of the upper blade 100 which are secured to the hub 72 and rotate with it.

The hub 72 includes a lower section 74 having a central vertical orifice 76 defined therein of a width and height such that it can receive the vessel extension 60, with clearance both at the top of the upstanding central vessel extension 60 and the outside of the extension, whereby the hub 72 may rotate around the stationary upstanding extension 60.

The upper, downwardly facing, annular wall 77 of the opening 76 into the hub 72 is high enough to clear the top end of the central extension of the vessel bottom 50. However, the downwardly facing wall 77 inside the hub 72 rests on the upwardly facing horizontal junction wall 65 of the shaft 16.

The annular bottom 78 of the hub 72 is supported just above the surface of the annular central section 58 of the vessel bottom 50 and holds the hub wall 77 slightly above the upstanding central extension 60 of the vessel bottom and thereby eliminates any frictional engagement between the hub and the vessel bottom, while ensuring proper engagement between the hub 72 and the driven shaft 16.

The hub 72 has an upper section 80 which has a narrowed width polygonal cross-section opening 82 therein having a cross-sectional profile corresponding to that of the upper section 66 of the shaft 16, whereby the shaft upper section 66 may be received into the polygonal opening 82 and the cooperating polygonal configurations assure that as the shaft 16 is driven, it, in turn, correspondingly rotates the hub 72. The upper section 80 of the hub 72 is knurled on its exterior at 84 to facilitate manual grasping, insertion and removal.

The bottom section 86 of the lower part 74 of the hub 72 is wider than the rest of the hub 72 and its exterior diameter approximates that of the annular margin 56 on the vessel bottom. With the blade assembly 70 in place on the shaft 16, the entire central section 58 of the vessel bottom 50 is covered, whereby all food in the vessel 20 that is not resting on the hub 72 is resting on the inclined, frusto-conically shaped vessel bottom 50.

Fixedly attached adjacent to the bottom end of the section 86 of the hub 72 is the lower blade 90. The blade 90 extends from outside of the hub and has a curved shape, as shown in FIG. 2. In the blade assembly illustrated, the leading edge 92 of the blade 90 is sharpened for cutting. The blade 90 extends out to its outer end portion 94 which almost contacts the interior wall 44 of the vessel 20. Because the vessel bottom inclines downwardly from the center of the vessel and due to the centrifugal force generated in the food being processed by the rotation of the blade assembly 70, the blade 90 must reach nearly to the side wall 44 in order to ensure processing of all of the food held in the vessel 20.

As appears in FIGS. 3 and 4, the blade 90 does not extend horizontally out from the side of the hub or coplanarly with the bottom end 78 of the hub 72. Instead, the blade 90 angles downwardly so as to be parallel to and spaced a slight distance above the vessel bottom 50. The blade 90 is flat and is so oriented that its entire body moves through and defines a frusto-conical surface parallel to the frusto-conical surface of the vessel bottom 50.

Higher up along the hub bottom section 86 from the blade 90 and projecting from the diametrically opposite side of the hub 72 is the upper blade 100. The upper blade 100 has all of the above described characteristics of the lower blade 90, except that the upper blade is elevated further above the vessel bottom 50. The upper blade 100 also is inclined with respect to the hub so as to extend generally parallel to the vessel bottom.

With the above described apparatus and particularly the combination of the vessel 20 with its novel vessel bottom 50 and the blade assembly 70 with its appropriately oriented blades 90 100, food processing is made quite efficient, as compared with known food processors.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A vessel and blade assembly for a food processor, or the like, comprising:

said vessel having a side wall surrounding and defining an interior space and having a bottom covering and closing off said side wall and defining said interior space;

said bottom having a central portion near the center of the bottom and away from said side wall; said bottom being gradually upraised into said interior space, moving inwardly along said bottom from said side wall toward said central portion of said bottom;

said blade assembly comprising a hub supportable in said vessel interior space above said vessel bottom central portion; said hub having a side periphery; a first blade projecting away from said hub side periphery near said vessel bottom and being supported by said hub for rotation with respect to said vessel near said vessel bottom; said first blade being inclined with respect to said hub so as to extend generally parallel to said vessel bottom;

a second blade projecting away from said hub side periphery in a different direction than the first said blade being positioned along said hub higher off said vessel bottom than said first blade, and also being supported by said hub for rotation with respect to said vessel; said second blade being inclined with respect to said hub so as to also extend generally parallel to said vessel bottom; both said blades being of a length to extend nearly into contact with said side wall.

2. The assembly of claim 1, wherein said vessel bottom is frusto-conically shaped, with the apex of the frusto-conically shaped said bottom projecting into said interior space of said vessel.

3. The assembly of claim 2, wherein the said frusto-conical shape of said bottom terminates, on the one hand, at its exterior where said frusto-conical bottom merges with said side wall and, on the other hand, at its apex where said frusto-conical bottom merges with said central portion of said bottom.

4. The assembly of claim 3, wherein said blades are attached to said hub and said hub and said blades rotate together.

5. The assembly of claim 4, wherein said vessel has an opening through its said bottom central portion; said opening being defined and surrounded by an upstanding cylindrical wall on said vessel bottom and projecting into said interior space.

6. A food processor, comprising:

said vessel and blade assembly of claim 1; a base for supporting said vessel; a driven shaft and a motor for driving said shaft; said shaft extending into engagement with said hub for rotating said hub; said blades being attached to said hub and said hub and said blades being rotatable together, whereby said blades are rotated with respect to said vessel by said driven shaft.

7. The food processor of claim 6, wherein said vessel has an opening through its said bottom central portion, through which said shaft projects to and engages with said hub.

8. The food processor of claim 7, wherein said opening in said vessel bottom central portion is defined and surrounded by an upstanding cylindrical wall on said vessel bottom.

* * * * *